Patented May 9, 1944

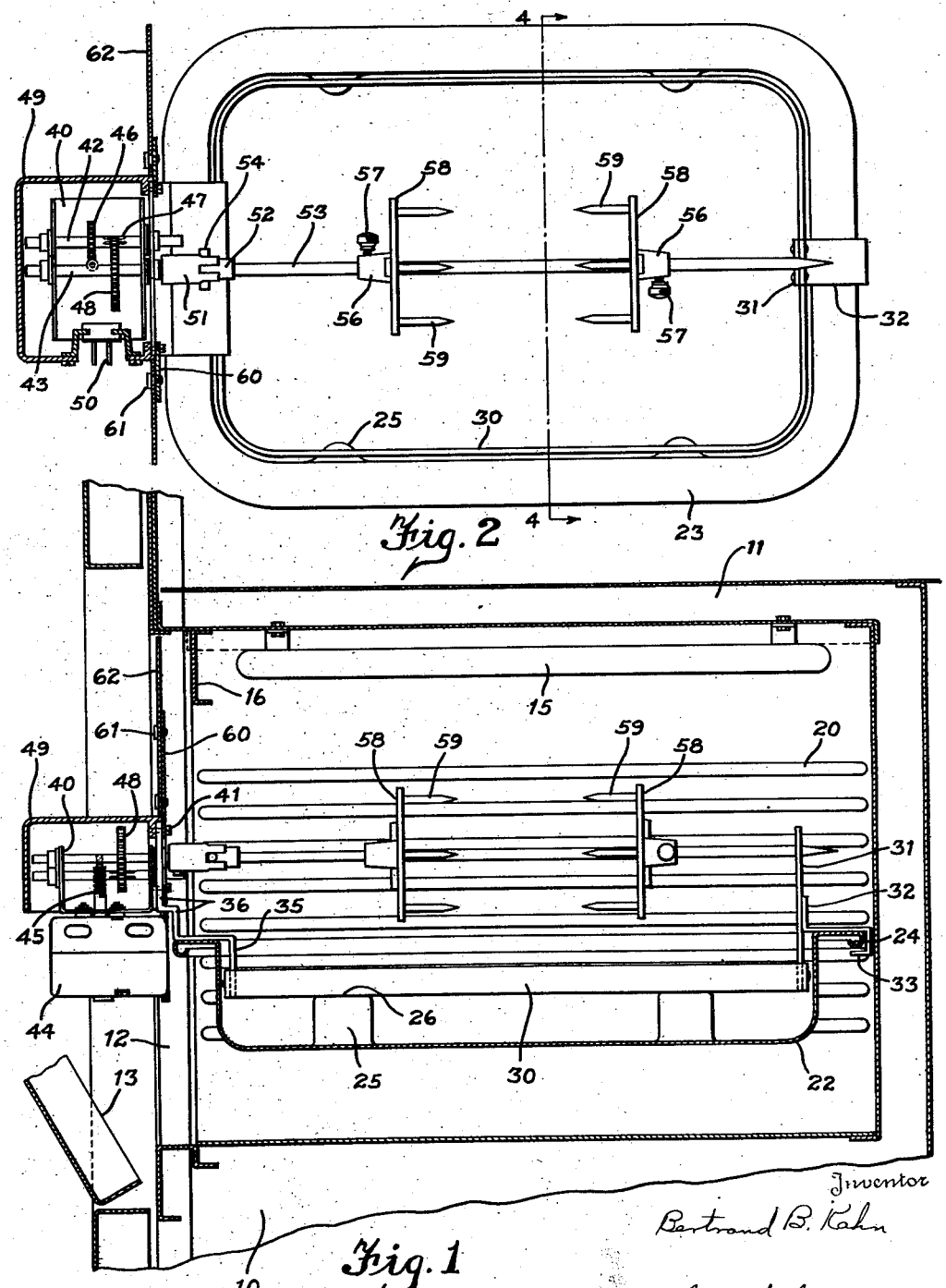

2,348,545

UNITED STATES PATENT OFFICE 2,348,545

ROASTER FOR STOVES

Bertrand B. Kahn, Cincinnati, Ohio, assignor to The Estate Stove Company, Hamilton, Ohio, a corporation of Ohio Application May 15, 1941, Serial No. 393,607

12 Claims. (Cl. 99—421)

This invention relates to ovens for stoves and more particularly to roasting devices for use therein.

It is the principal object of the invention to provide a roasting device as an attachment to be used when desired in an oven of the usual and conventional construction for rotatably supporting a roast or the like and which can be readily removed from operative position to permit of normal usage of the oven space.

It is a further object to provide a roasting device which is adapted for use with the regular broiler pan and to be received in operative position on such pan, providing a simple and inexpensive device for rotatably supporting the meats and the like while roasting.

It is a further object to provide a motor operated roasting device detachably received upon the customary broiler pan and adapted to be placed with the broiler pan at a predetermined elevation within the oven to subject the meat thereon to the oven heat while leaving the motor and driving mechanism substantially out of the heated zone.

It is a further object to provide such a device in which an adjustably mounted closure is provided for enclosing the oven space when desired, the closure being adjustably mounted to be received in predetermined relation to the oven door opening at varying elevations of the device within the oven.

Other objects and advantages will be apparent from the following description, the accompanying drawings, and the appended claims.

In the drawings,

Fig. 1 is a broken vertical sectional view through an oven compartment showing the roasting device of the present invention in operative position therein;

Fig. 2 is a view in horizontal section through the drive mechanism and in elevation showing the roasting device assembled upon the regular broiler pan and withdrawn from the oven;

Figure 3:
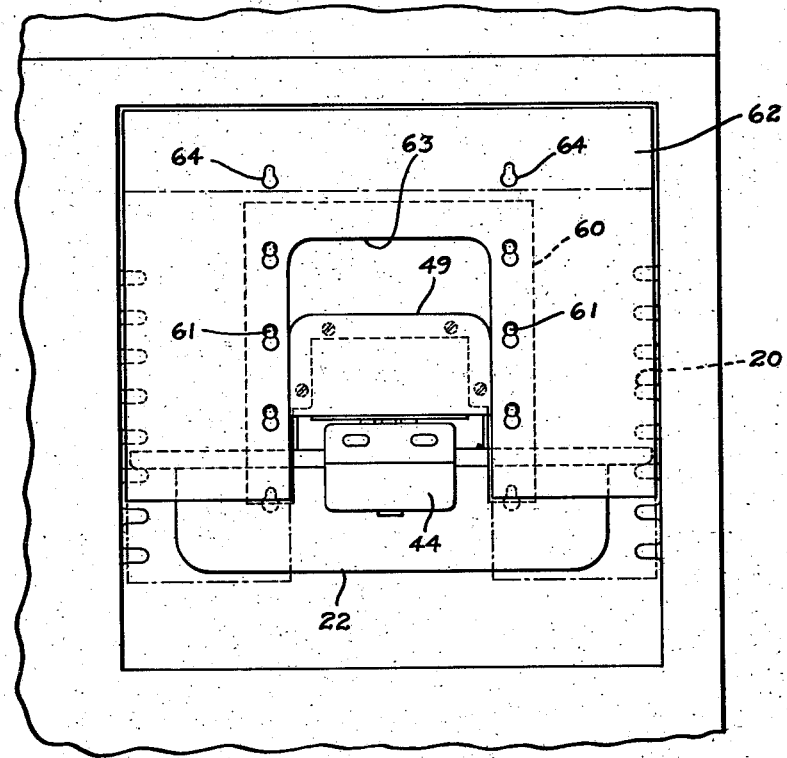
Fig. 3 is an end elevational view showing the front of the oven with the roasting device in place and the closure adjusted to substantially close the opening to the oven compartment.
Figure 4:
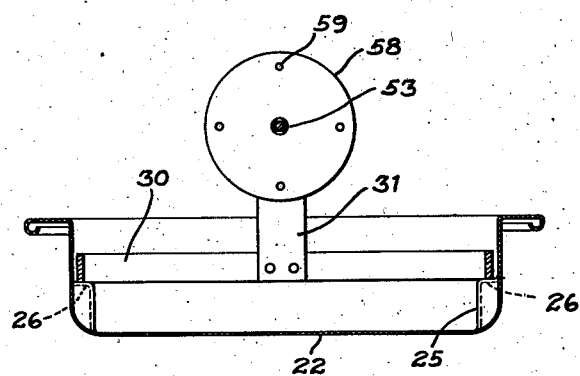
Fig. 4 is a detail sectional view through the pan showing the frame and rotatable spit, on the line 4—4 of Fig. 2.

Referring to the drawings, which discloses a preferred embodiment of the invention, a conventional stove structure is shown at 10, being provided with suitable walls leaving a space 11 therebetween for receiving heat insulating material in the usual way. The front of the oven is recessed as shown at 12 and the usual hinged door is shown in partially open position at 13. This oven space may comprise either a baking oven, into which heat may be supplied from above and below the material being cooked, or may be a specially provided broiling oven with only a single source of heat suitably located for carrying out the normal broiling operations. A heat source 15 is shown at the top of the oven space, and may comprise either a gas, electric, or other suitable heating means for directing a broiling heat to and upon the material being cooked. Likewise an inwardly projecting flange 16 is preferably provided for protecting the heating element 15 and for confining the heat therefrom in the main oven space.

The inner side walls of the oven are preferably provided with suitable projections 20, either in the form of continuous ribs as shown, or in the form of a series of spaced projections, as commonly practiced in the art for forming side supports for receiving a broiler pan. Preferably such ribs 20 are formed as an integral part of the side wall panel and are finished with an enamel finish so that they present a smooth and uniform series of supports, providing for receiving and adjustably supporting a broiler pan at different elevations within the oven space.

The broiler pan is shown at 22 and is preferably of a conventional type, permitting its regular use as a broiler pan, when the roasting device of the present invention is not in use. The pan preferably is formed as an integral piece, and is provided with a marginal flange 23 having a reverse curved portion 24 forming a suitable support for being slidably received upon the ribs 20, such curved portion 24 preferably extending around the entire periphery of the pan. Likewise on its longitudinal sides, the pan is formed with inwardly projecting portions 25, which extend upwardly from the bottom a distance corresponding to approximately one-half of the depth of the pan, and are provided with flat topped faces 26 for receiving the frame of the roasting device thereon.

Such roasting device comprises a rectangular frame 30 shaped to the inner contour of the broiler pan and adapted to fit in edgewise supporting position upon the flat faces 26, in assembled position within the pan. An upwardly projecting plate 31 is fastened to the frame at its central rear portion and projects upwardly therefrom, being suitably apertured to provide a bearing support for the rotatable spit. A rear bracket 32 is fastened to plate 31 by suitable means such as riveting or welding, and is provided with a hook shaped portion 33 adapted to be fitted over and received under the curved flange 24 of the broiler pan, to detachably hold the frame in operative position thereon. The bracket thus rests upon the top face of the flange 23 and is quickly removably secured beneath curved portion 24 thereof.

At the forward end, a somewhat wider bracket 35 is fastened to the frame at its central front portion, is bent forwardly to rest upon the top of flange 23 of the pan, and is additionally bent forwardly and upwardly as shown at 36 to provide a support for the drive mechanism.

Such mechanism is supported from a U-shaped supporting plate 40 suitably attached to bracket 36 by means of bolts 41, and apertured at corresponding positions on its two opposed faces for receiving and rotatably supporting a pair of drive shafts 42 and 43. To the lower face of bracket 40 is bolted the drive motor 44 which for reasons of economy and lightness in weight, is preferably a small relatively high speed universal type electric motor adapted to develop sufficient power, such motor requiring that its speed be substantially reduced for driving the rotatable spit. The shaft of the motor carries a worm 45 which meshes with a worm gear 46 on shaft 42. Gear teeth 47 are in turn cut in shaft 42 and provide a further speed reduction by driving the large gear 48 on shaft 43, at a suitably low speed for the rotation of the spit. A housing 49 encloses the drive mechanism and is provided with an electrical attachment 50 for connection to a source of power.

Both shaft 42 and shaft 43 extend through the plate 36 to a position inwardly thereof where driving connections are provided for rotatably operating the spit. As will be evident, while shaft 42 may be utilized if desired it rotates at a substantially higher speed than shaft 43, and for most purposes the slower speed shaft is more desirable. As shown, a coupling member 51 is attached to the end of shaft 43 and is formed with a slotted socket at its end within which is detachably received a driven member 52 carried on rotating shaft 53 affording support for the forward end of the shaft. A pin 54 extends through the slots in member 51 to provide for positively driving the shaft while likewise supporting the end thereof with a detachable universal connection. The opposite end of shaft 53 is rotatably supported in the bearing aperture in plate 31.

Adjustably mounted upon shaft 53 are a pair of collars 56 adapted to be fastened individually in position thereon by means of set screws 57. The collars are attached to discs 58 each of which carry a series of prongs 59 standing in opposed relation to each other to provide for receiving and rotatably driving the meat or other material impaled on the spit.

It is at times desirable to close to a greater or less extent the opening into the oven space during the carrying out of a roasting operation such as that described herein and in accordance with the present invention means are provided for effecting such degree of closure as desired, which means is also adaptable to the various positions at which the broiler pan is received, so that it is completely flexible for the range of pan positions and the degree of closure desired. For this purpose an inverted U-shaped plate 60 is fastened to bracket 36 at opposite sides of the drive mechanism and supported in position projecting upwardly therefrom. Two series of shouldered supporting bolts 61 are fastened to the plate in regular spaced relation, and in two vertically extending rows, these bolts having enlarged heads and a body portion of lesser diameter spacing the heads from the supporting plate.

A second plate 62 having a central cut out section 63 adapted to be received over the housing 49 and the drive mechanism is provided for being adjustably supported upon the bolts 61. For this purpose plate 62 is formed with two vertically extending series of apertures 64 consisting of a lower enlarged portion of sufficient diameter to be received over the heads of the bolts 61, and an upper smaller diameter portion, just large enough to be received over the shouldered portion of the bolts. The number of such apertures in each vertical row preferably exceeds the number of bolts in the corresponding row, and thus provision is made for quickly and detachably supporting closure plate 62 at various elevations with respect to the inner plate 60 and its supporting bolts 61. Thus as shown in Fig. 3, with the broiler pan supported somewhat below the middle portion of its range of vertical positioning, and the roasting device and its drive mechanism correspondingly supported, the closure member 62 is arranged in such position as to substantially completely close the opening to the oven space and can be readily repositioned or removed by merely being lifted slightly to allow the large apertures to clear the heads of bolts 61, whereupon it may be relocated or removed as desired.

The invention therefore provides a simple and highly satisfactory roasting mechanism which is adapted to be received as an attachment to and upon the regular broiling pan. In this way the entire roasting mechanism may be supplied as an accessory, to be used in conjunction with existing ovens and broiler pans, or may be sold as a part of the complete range. In the latter case it is available at a minimum of expense and can be used with the least requirement of work and effort, since it makes use of the regular broiler pan.

In assembling the roasting device for use, the driving coupling 51 and 52 is first detached and the rotating shaft or spit 53 is inserted through the meat or material to be roasted. The two plates 58 are then located on the shaft and fastened thereto in position to engage the meat and support it in proper rotative position. Thereafter the spit may be assembled in the rear bearing plate 31 and the front driving connection established to similarly support the forward end of the shaft. In order to position the device upon the broiler pan, it is only necessary to lower the rear hook 33 into engaging position with the flange 24 of the broiler pan by holding the mechanism in inclined position until such engagement takes place. Thereupon the entire mechanism can be lowered into its normal supporting position upon the elements 26 of the pan, these elements thus providing a firm and secure support for supporting the entire mechanism.

The device can then be positioned in the oven space in the normal manner, and positioned at a suitable and predetermined elevation within the oven space corresponding to the height at which it is desired to support the meat with respect to the heating element 15. During the cooking operation, it will be evident that the drive motor and the speed reduction gearing are both located substantially completely out of the highly heated zone, and hence are not subject to any difficulties or requirements as to special construction, lubrication, and the like, by reason of operating under high temperature conditions.

In the event that it is desired to close the opening of the oven space to a greater or lesser degree, the front plate 62 may be then positioned on the supporting bolt heads 61 and held thereby at a suitable position to secure the proper degree of closure of the oven. At the end of the roasting operation, the entire mechanism may be withdrawn and the meat juices and the like will be collected in the broiler pan where they are removed from the highly heated zone and hence are retained without objectionable burning but in a properly heated condition. The entire interior of the stove and the broiler mechanism are readily kept in a clean and sanitary condition, because of the simplicity of the structure and the use of the regular stove construction so far as possible throughout. Upon removal of the roasting device from the pan, the latter is immediately available for normal use in the oven, with the regular oven door either open or in closed position, as may be desired.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A roasting device of the character described for use in an oven comprising a pan having a marginal flange adapted to be received in predetermined position within an oven compartment and supported at its sides by said marginal flange upon the oven walls, and a unitary rotary spit assembly detachable from said pan as a unit including a frame member removably received on and supported by said pan, means for securing said frame member in operative position upon said pan in engagement with said marginal flange on the ends of the pan and adapted for removal by direct upward lift therefrom, a drive mechanism carried by said frame and overhanging the pan to be positioned outwardly of the oven compartment in the operative position thereof, a spit operatively connected with said drive mechanism, and means for supporting said spit upon said frame for rotary movement within said oven compartment.

2. In a roasting device of the character described adapted to be detachably received on a broiler pan and to be positioned within an oven at a predetermined location with respect to the heat source therein comprising a frame for seating upon said pan including a bracket for engaging under the edge of said pan which is innermost in the oven and a bracket extending forwardly from the pan, drive mechanism carried on said forwardly extending bracket, a shaft rotatably supported from said brackets and operatively connected with said drive mechanism, said frame, said brackets and said drive mechanism being quickly detachable as a unit from said pan upon tilting to disengage said bracket from said inner edge of the pan to provide for normal use of said pan in said oven.

3. A roasting device of the character described for use in an oven compartment and adapted to be detachably received as a unit on a broiler pan having a marginal flange for supporting such pan from its sides in the oven compartment comprising a frame structure receivable upon and within the lateral extent of said broiler pan, means for detachably retaining said frame structure upon the end portions of said marginal flange upon lowering the same in place thereon and providing for direct removal from said pan upon upward tilting, drive mechanism carried by said frame structure and located outwardly of the oven compartment in the operative position of said device, a spit rotatably supported in said frame structure and means establishing a detachable driving connection between said spit and said drive mechanism providing for rotation of the former in operation.

4. A roasting device of the character described adapted to be positioned in an oven compartment comprising a broiler pan having a marginal flange thereon for supporting said pan from its sides at different elevations within said oven compartment, said pan being formed with inwardly projecting abutments, a unitary roasting mechanism removably positioned upon said pan and adapted to be supported thereby at a predetermined elevation within the oven compartment including a frame member received within said pan and upon said abutments, means on said frame for engaging said marginal flange at the ends of said pan for retaining said roasting device in operative position thereon, drive mechanism supported on said frame and overhanging the outer end of the pan to be substantially out of the heated zone during operation, a rotating spit supported on said frame, and means establishing a driving connection from said drive means to said spit for operation thereof.

5. A roasting device of the character described adapted to be positioned within an oven space at a predetermined elevation therein comprising a broiler pan having a marginal flange thereon for supporting said pan from its sides at different elevations within said oven compartment, a frame structure, means for supporting said frame structure upon the marginal flange at the ends of said pan at the elevation within the oven determined by the position of said pan, drive mechanism supported by said frame structure and located outwardly of said oven space in its operative position, a rotary spit supported by said frame structure within said oven space, means for driving said rotary spit from said drive mechanism, and means for closing the opening to the oven space at varying elevations of said roasting device therein, said means including a closure member, and means supported by said frame structure for changing the vertical positioning of said closure member to adjust the position thereof as desired.

6. A roasting device of the character described adapted to be positioned within an oven space at a predetermined elevation therein comprising a frame structure, means for supporting said frame structure at a predetermined desired elevation within the oven, drive mechanism supported by said frame structure and located outwardly of said oven space in its operative position, a rotary spit supported by said frame structure within said oven space, means for driving said rotary spit from said drive mechanism, and means for closing the opening to the oven space at varying elevations of said roasting device therein, said means including a series of supporting elements vertically arranged and supported from said frame structure, and a closure plate having a corresponding series of elements for coacting with said first mentioned series to provide for support thereof at a predetermined desired elevation.

7. A roasting device of the character described adapted to be positioned within an oven space at a predetermined elevation therein comprising a frame structure, means for supporting said frame structure at a predetermined desired elevation within the oven, drive mechanism supported by said frame structure and located outwardly of said oven space in its operative position, a rotary spit supported by said frame structure within said oven space, means for driving said rotary spit from said drive mechanism, and means for closing the opening to the oven space at varying elevations of said roasting device therein, said means including a series of supporting elements vertically arranged and supported from said frame structure, and a closure plate having a corresponding series of elements for coacting with said first mentioned series to provide for support thereof at a predetermined desired elevation, said closure member being apertured to be received in telescoping relation over said forwardly projecting drive mechanism.

8. A roasting device of the character described for use in an oven having a series of vertically spaced projections formed on its side walls comprising a broiler pan having a marginal flange providing for receiving and supporting the same at a predetermined desired elevation upon the projections of said oven walls, a frame member detachably received upon said broiler pan and having means for engaging the marginal flange at the rear of said broiler pan for securing the same in operative position thereon, drive mechanism overhanging said pan and located outwardly of the oven compartment in the operative position of the device, and a rotary spit operated from said driving mechanism and supported by said frame structure above said broiler pan.

9. A roasting device of the character described for use in an oven having a series of vertically spaced projections formed on its side walls comprising a broiler pan having a marginal flange providing for receiving and supporting the same at a predetermined desired elevation upon the projections of said oven walls, a frame member detachably received upon said broiler pan and having means for engaging the marginal flange at the rear of said broiler pan for securing the same in operative position thereon, drive mechanism overhanging said pan and located outwardly of the oven compartment in the operative position of the device, a rotary spit operated from said driving mechanism and supported by said frame structure above said broiler pan, and means carried by said frame structure for closing the opening to said oven compartment.

10. A roasting device of the character described for use in an oven having a series of vertically spaced projections formed on its side walls comprising a broiler pan having a marginal flange providing for receiving and supporting the same at a predetermined desired elevation upon the projections of said oven walls, a frame member detachably received upon said broiler pan and having means for engaging the marginal flange at the rear of said broiler pan for securing the same in operative position thereon, drive mechanism overhanging said pan and located outwardly of the oven compartment in the operative position of the device, a rotary spit operated from said driving mechanism and supported by said frame structure above said broiler pan, and adjustable closure means carried by said frame structure and operable throughout the range of vertical positions of said pan for closing of the front opening to the oven.

11. A roasting device of the character described for use in an oven having a series of vertically spaced projections formed on its side walls comprising a broiler pan having a marginal flange providing for receiving and supporting the same at a predetermined desired elevation upon the projections of said oven walls, a frame member detachably received upon said broiler pan and having means for engaging the marginal flange at the rear of said broiler pan for securing the same in operative position thereon, drive mechanism overhanging said pan and located outwardly of the oven compartment in the operative position of the device, a rotary spit operated from said driving mechanism and supported by said frame structure above said broiler pan, adjustable closure means carried by said frame structure and operable throughout the range of vertical positions of said pan for closing of the front opening to the oven, said closure means including a series of vertically spaced supporting elements carried by said frame structure, and a removable closure member having a cooperating vertically arranged series of supporting elements and adapted to be received at varying vertical positions thereon to close said oven opening.

12. A roasting device of the character described for use in an oven having a series of vertically spaced projections formed on its side walls comprising a broiler pan having a marginal flange providing for receiving and supporting the same at a predetermined desired elevation upon the projections of said oven walls, a frame member detachably received upon said broiler pan and having means for engaging the marginal flange at the rear of said broiler pan for securing the same in operative position thereon, drive mechanism overhanging said pan and located outwardly of the oven compartment in the operative position of the device, a rotary spit operated from said driving mechanism and supported by said frame structure above said broiler pan, and adjustable closure means carried by said frame structure and operable throughout the range of vertical positions of said pan for closing of the front opening to the oven, said closure means comprising an extending series of shouldered bolts supported by said frame structure adjacent the oven opening, and a separable plate of a width corresponding to the width of the oven opening adapted to close the oven opening and provided with a corresponding series of vertically arranged enlarged apertures, providing for receiving and detachably supporting said plate in a series of adjustable vertical positions upon said bolts.

BERTRAND B. KAHN.